US010447004B2

(12) United States Patent
Foley (10) Patent No.: US 10,447,004 B2
(45) Date of Patent: Oct. 15, 2019

(54) LASER FAULT TOLERANCE AND SELF-CALIBRATION SYSTEM

(71) Applicant: NLIGHT, INC., Vancouver, WA (US)

(72) Inventor: Robert Joseph Foley, Portland, OR (US)

(73) Assignee: NLIGHT, INC., Vancouver, WA (US)

( * ) Notice: Subject to any disclaimer, the term of this patent is extended or adjusted under 35 U.S.C. 154(b) by 286 days.

(21) Appl. No.: 15/355,996

(22) Filed: Nov. 18, 2016

(65) Prior Publication Data

US 2017/0149203 A1    May 25, 2017

Related U.S. Application Data

(60) Provisional application No. 62/257,669, filed on Nov. 19, 2015.

(51) Int. Cl.
*H01S 5/00* (2006.01)
*H01S 5/40* (2006.01)
(Continued)

(52) U.S. Cl.
CPC ........ *H01S 5/0021* (2013.01); *G05B 19/4065* (2013.01); *H01S 3/06754* (2013.01); *H01S 3/09408* (2013.01); *H01S 3/1301* (2013.01); *H01S 3/1305* (2013.01); *H01S 5/06825* (2013.01); *H01S 5/4012* (2013.01); *G05B 2219/31366* (2013.01);
(Continued)

(58) Field of Classification Search
CPC combination set(s) only.
See application file for complete search history.

(56) References Cited

U.S. PATENT DOCUMENTS 3,279,532 A    10/1966    Pfeil
5,173,957 A    12/1992    Bergano
(Continued)

FOREIGN PATENT DOCUMENTS

CN    1735886 A    2/2006
CN    101593928 A    12/2009
(Continued)

OTHER PUBLICATIONS

USPTO; International Search Report and Written Opinion for PCT/US17/48955 dated Dec. 26, 2017; 14 pages.
(Continued)

*Primary Examiner* — Moazzam Hossain
(74) *Attorney, Agent, or Firm* — Schwabe Williamson & Wyatt, P.C.

(57) ABSTRACT

A laser diode system includes plurality of laser pumps, each of the plurality of laser pumps including a plurality of laser diode drivers and a plurality of laser diode elements, wherein each of the plurality of laser diode drivers is electrically coupled to power at least two of the plurality of laser diode elements. A combiner electrically is coupled to the plurality of laser diode elements to combine an output of each of the plurality of laser pumps to generate a combined output light. A controller identifies a failed laser pump or a failed laser diode element, receives an encoded key to gain access to the controller, and disables the failed laser pump or the failed laser diode element based at least in part on authenticating the encoded key.

20 Claims, 6 Drawing Sheets

(51) Int. Cl.
*G05B 19/4065* (2006.01)
*G06F 21/31* (2013.01)
*H01S 3/094* (2006.01)
*H01S 3/13* (2006.01)
*H01S 3/067* (2006.01)
*H01S 5/068* (2006.01)
*H01S 3/10* (2006.01)

(52) U.S. Cl.
CPC .... *G05B 2219/33198* (2013.01); *G06F 21/31* (2013.01); *H01S 3/094003* (2013.01); *H01S 3/10069* (2013.01); *H01S 3/1306* (2013.01); *H01S 5/4025* (2013.01)

(56) References Cited

U.S. PATENT DOCUMENTS

| | | | |
|---|---|---|---|
| 5,241,414 A * | 8/1993 | Giles | H01S 3/094003 359/341.33 |
| 5,249,328 A | 10/1993 | Shin | |
| 5,594,748 A | 1/1997 | Jabr | |
| 5,903,583 A | 5/1999 | Ullman | |
| 5,912,748 A | 6/1999 | Jander | |
| 6,517,221 B1 | 2/2003 | Xie | |
| 6,583,926 B1 * | 6/2003 | Wu | H01S 3/1301 359/337 |
| 8,971,359 B2 | 3/2015 | Creeden | |
| 9,285,125 B2 | 3/2016 | Lee | |
| 2005/0103472 A1 | 5/2005 | Lofland | |
| 2005/0113068 A1 * | 5/2005 | Hoffmann | H04L 9/3263 455/411 |
| 2006/0002080 A1 | 1/2006 | Leija | |
| 2006/0027356 A1 | 2/2006 | Sulzer | |
| 2006/0191838 A1 | 8/2006 | Lowell | |
| 2006/0291510 A1 * | 12/2006 | Juluri | H01S 5/0683 372/29.021 |
| 2007/0189350 A1 * | 8/2007 | Young | G06F 1/105 372/50.124 |
| 2009/0266105 A1 | 10/2009 | Viklund | |
| 2010/0155040 A1 | 5/2010 | Hoffmann | |
| 2012/0103580 A1 | 5/2012 | Buttignol | |
| 2012/0301097 A1 | 11/2012 | Nakano | |
| 2013/0010265 A1 | 1/2013 | Curtis | |
| 2015/0159884 A1 | 6/2015 | Whang | |
| 2016/0135892 A1 * | 5/2016 | Yu | A61B 18/24 606/3 |
| 2017/0170622 A1 | 6/2017 | Kashiwagi | |
| 2017/0329092 A1 | 11/2017 | Sanders | |
| 2018/0062347 A1 | 3/2018 | Hodges | |
| 2018/0175577 A1 | 6/2018 | Hodges | |

FOREIGN PATENT DOCUMENTS

| | | |
|---|---|---|
| CN | 103475475 A | 12/2013 |
| JP | 9145072 | 6/1998 |
| WO | 2018112220 | 6/2016 |
| WO | 2016129447 | 8/2016 |
| WO | 2017087865 | 5/2017 |
| WO | 2017197362 | 11/2017 |
| WO | 2018044813 | 3/2018 |

OTHER PUBLICATIONS

European Patent Office, Rijswik; International Search Report and Written Opinion for PCT/US17/066453; dated May 15, 2018; 15 pages.

USPTO; International Search Report and Written Opinion for PCT/US16/62875; dated Feb. 2, 2017; 8 pages.

European Patent Office, Partial Supplementary European Search Report in European Patent Application No. 16867267.1, dated Jul. 2, 2019, 12 pages.

China National Intellectual Property Administration, Office Action in Chinese Patent Application No. 201680067601.1, dated Aug. 12, 2019, 7 pages, no English available.

* cited by examiner

LASER FAULT TOLERANCE AND SELF-CALIBRATION SYSTEM

RELATED APPLICATIONS

This application is a non-provisional of and claims priority to U.S. provisional application No. 62/257,669, filed Nov. 19, 2015, which is incorporated herein by reference in its entirety.

TECHNICAL FIELD

The present disclosure relates to a laser fault tolerance and self-calibration system.

BACKGROUND

A fiber laser is a type of optical laser that includes a clad fiber rather than a rod, a slab, or a disk. Fiber lasers reflect light through an optical cavity such that a stream of photons stimulates atoms in a fiber that store and release light energy at useful wavelengths. Fiber type, core size, numerical aperture, refractive index, and doping of the fiber contribute to the range and possibilities of light propagation using fiber lasers.

Figure 1A:
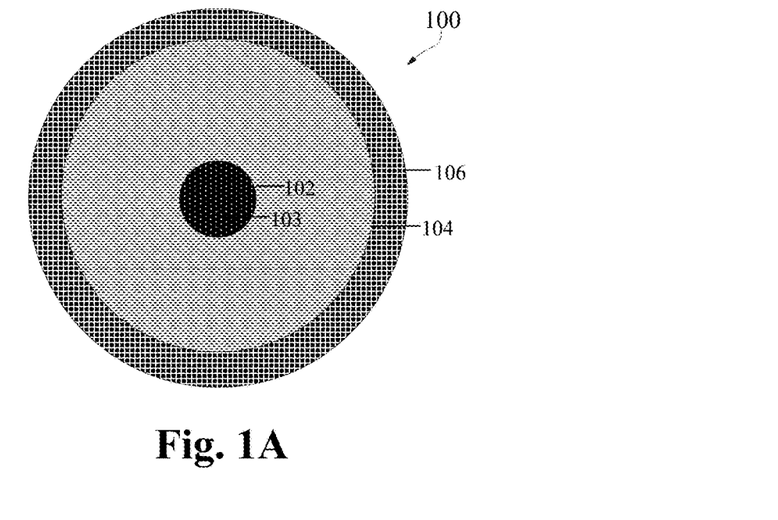
FIG. 1A diagrams an embodiment of a cross section of a fiber laser according to the present disclosure.
Figure 1B:
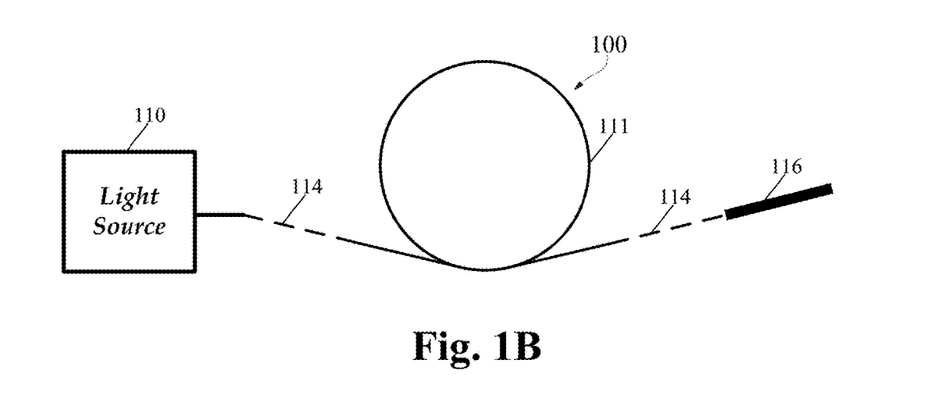
FIG. 1B diagrams an embodiment of a laser system according to the present disclosure.

A fiber laser 100 is shown in FIGS. 1A and 1B. Fiber laser 100 may include a core 102 surrounded by a cladding 104 and a protective coating 106. Core 102 may have a different refractive index than cladding 104. Depending on size, refractive index, and wavelength, core 102 may be single mode or multi-mode although single mode is preferred for many applications. Core 102 may be made of a variety of materials including well-known silica-based materials. Core 102 may include a dopant 103 from the lanthanide series of chemicals including Erbium or Ytterbium that release light energy at useful wavelengths. Fiber laser 100 may be illuminated by a light source 110, e.g., a laser pump including a laser diode element driven by a laser diode driver with a corresponding control unit. Light source 110 may be a single diode, an array of diodes, or many separate pump diodes, each with a fiber going into a coupler. Fiber laser 100 may further include a grating 114 at both ends of coil 111 to manipulate or otherwise filter light source 110 and deliver it as a laser beam 116. Fiber laser 100 may be used in a variety of applications including welding heavy sheets of metal, cutting high-strength steel used to produce automobiles, cutting and drilling concrete, and microscale and nanoscale machining.

In some applications, fiber laser 100 may have a length between several millimeters and hundreds of meters, most commonly in the 1-30 meter range. Fiber laser 100 may be coiled 111 with a generally permissible bend radius in the 10-20 millimeters. Fiber laser 100 may release heat during operation that requires efficient heat removal to avoid damaging core 102 or cladding 104.

Fiber laser 100 may fail or malfunction after deployment to a customer's site for a variety of reasons including failure of any or a combination of components included in light source 110. Fiber laser 100, particularly light source 110, may be built using modular components that allow failure remediation by disabling or replacing some of the modular components to allow fiber laser 100 to continue operating at least at a reduced power level.

Additionally, spurious sensor readings at light source 110 may cause fiber laser 100 to appear to malfunction. The ability to continue operating by overriding or otherwise ignoring spurious sensor readings is desirable.

A need remains for an improved laser fault tolerance and self-calibration system.

BRIEF DRAWINGS DESCRIPTION

The present disclosure describes various embodiments that may be understood and fully appreciated in conjunction with the following drawings.

DETAILED DESCRIPTION

The present disclosure describes embodiments with reference to the drawing figures listed above. Persons of ordinary skill in the art will appreciate that the description and figures illustrate rather than limit the disclosure and that, in general, the figures are not drawn to scale for clarity of presentation. Such skilled persons will also realize that many more embodiments are possible by applying the inventive principles contained herein and that such embodiments fall within the scope of the disclosure which is not to be limited except by the claims.

Figure 2A:
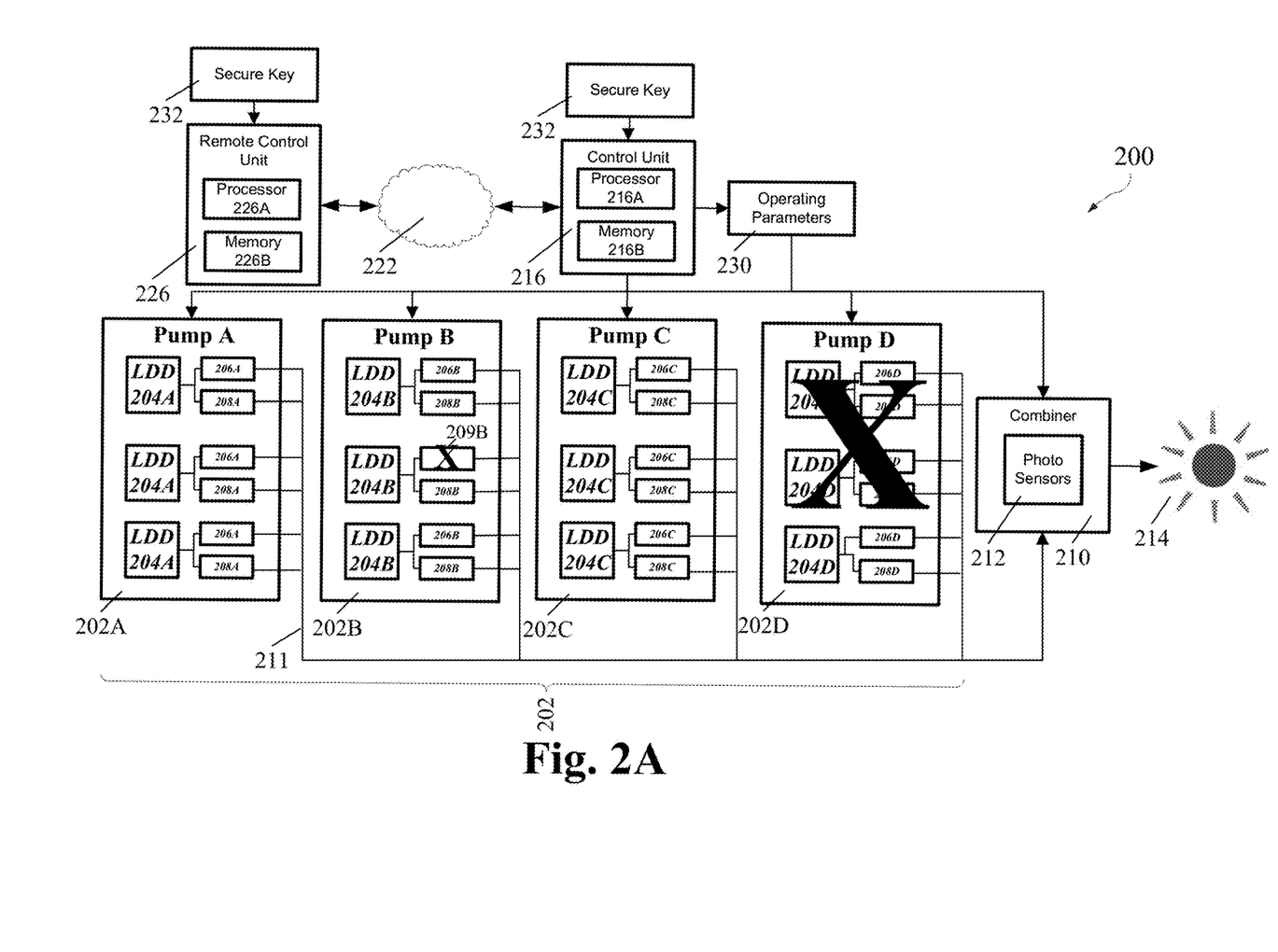
FIG. 2A diagrams an embodiment of a laser system according to the present disclosure.
Figure 2B:
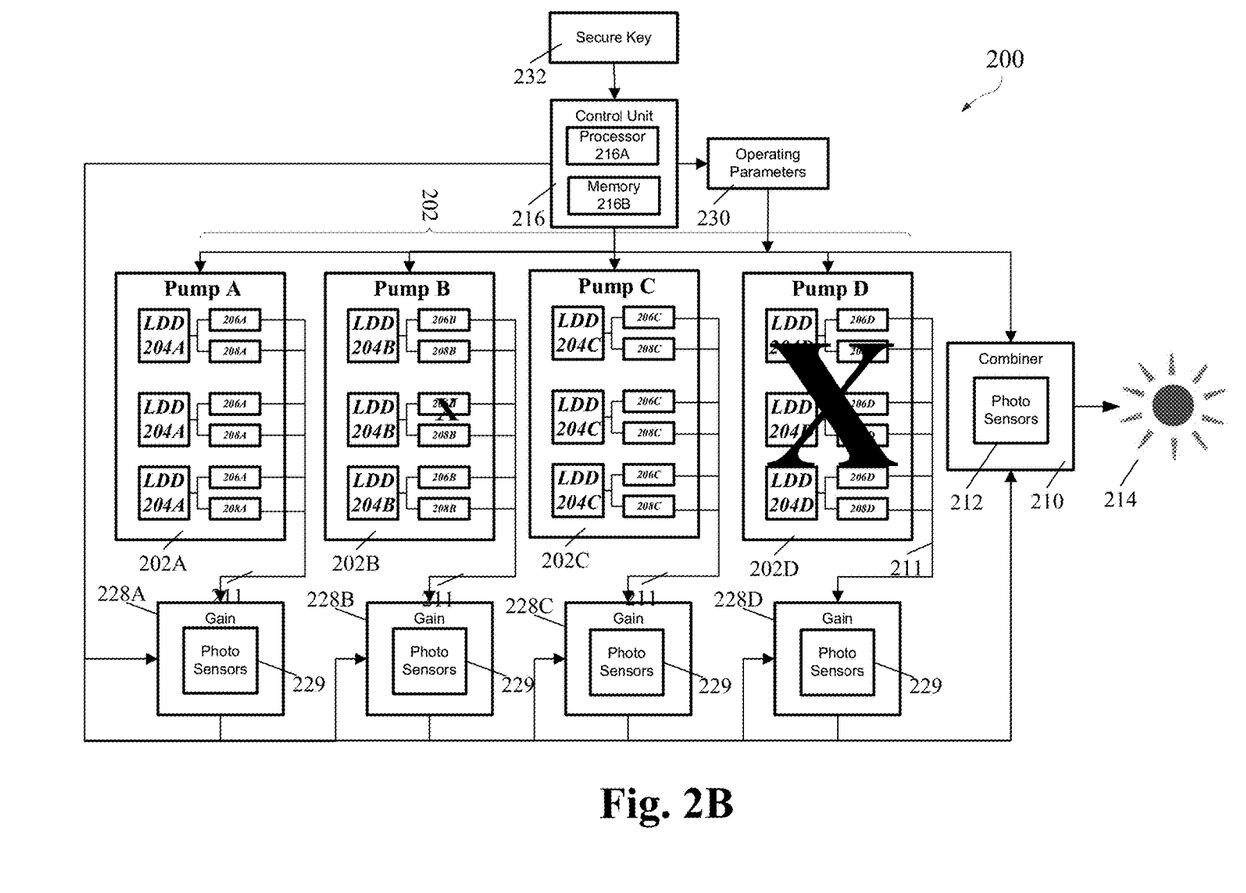
FIG. 2B diagrams an embodiment of a laser system according to the present disclosure.

FIG. 2A diagrams an embodiment of a laser system according to the present disclosure. FIG. 2B diagrams an embodiment of a laser system according to the present disclosure. Referring to FIGS. 1A, 1B, 2A, and 2B, a laser system 200 may include a plurality of laser pumps 202, e.g., pump 202A, pump 202B, pump 202C, and pump 202D, to source, generate, or pump laser light from a source through a fiber laser, e.g., fiber laser 100 shown in FIGS. 1A and 1B. Each of the plurality of pumps 202 may source, generate, or pump laser light at any wavelength and at any power level known to a person of ordinary skill in the art.

Each of the plurality of pumps 202, including pumps 202A, 202B, 202C, and 202D, may include one or more laser diode drivers (LDDs) 204A, 204B, 204C, and 204D. Each LDD 204A, 204B, 204C, or 204D, in turn, may be electrically coupled to drive at least two laser diode elements 206A and 208A, 206B and 208B, 206C and 208C, and 206D and 208D, respectively. Thus, pump 202A may include at least one LDD 204A electrically coupled to laser diode elements 206A and 208A and pump 202B may include at least one LDD 204B electrically coupled to laser diode elements 206B and 208B. Similarly, pump 202C may include at least one LDD 204C electrically coupled to laser diode elements 206C and 208C and pump 202D may include at least one LDD 204D electrically coupled to laser diode elements 206D and 208D.

FIGS. 2A and 2B show four pumps 202A, 202B, 202C, and 202D but a person of ordinary skill in the art should recognize that any number of pumps may be part of laser diode system 200.

For the sake of simplicity, the present disclosure will describe an embodiment of LDD 204A and laser diode elements 206A and 208A. Embodiments of LDDs 204B, 204C, and 204D may be similarly constructed and operated as LDD 204A. And embodiments of laser diode elements 206B, 208B, 206C, 208C, 206D, and 208D may be similarly constructed and operated as laser diode elements 206A and 208A.

In an embodiment, LDD 204A may generate a current necessary to drive laser diode elements 206A and 208A using a power source and attendant circuitry as is well known to a person of ordinary skill in the art. LDDs 204A-D may provide automatic power control to maintain constant optical power despite changes in the laser characteristics due to temperature variation or aging. The automatic power control may be implemented through well-known feedback loops that sense average optical power from the laser and adjusts a laser bias current so as to maintain constant optical power.

LDDs 204A-D may drive laser diode elements 206A-D and 208A-D using a bias current provided by a bias current or power source (not shown). In addition to biasing laser diode elements 206A-D and 208A-D, LDDs 204A-D may also control transmission of signals (such as digital data) for data communications applications. In this regard, LDDs 204A-D may include circuitry, e.g., differential transistors, together with a modulation current source to modulate the digital data for transmission. LDDs 204A-D may control the bias current for the laser diode elements 206A-D and 208A-D so as to provide the automatic power control function.

LDD 204A may be electrically coupled to at least two laser diode elements 206A and 208B, which may operate at any wavelength and at any power level known to a person of ordinary skill in the art. Each laser diode element 206A and 208A may generate a corresponding laser diode element output signal 211, which, in turn, may be received by combiner 210. Each laser diode element 206A or 208A may generate a signal 211 that ranges over several nanometers of bandwidth. To more narrowly focus the wavelength range output for each laser diode element 206A or 208A, pump 202a may include wavelength selecting elements, e.g., external fiber grating devices (not shown).

In an embodiment, combiner 210 may combine output signals 211 from all or a portion of the plurality of pumps 202. Combiner 210 may include, for example, polarization beam splitters, polarization multiplexers, birefringent elements, or any other element or circuit known to a person of ordinary skill in the art capable of generating a laser source signal 214. Combiner 210 may comprise any device capable of combining a plurality of wavelength signals 211 into a multiple wavelength laser source signal 214, such as, for example, one or more wavelength division multiplexers (WDM). Combiner 210 may receive laser diode element output signals 211 received from the plurality of pumps 202 and combine laser diode element output signals 211 to generate laser source signal 214, with a power level exceeding that of individual laser diode output signals 211. That is, combiner 210 may generate laser source signal 214 having an output power level corresponding to the combination of laser diode element output signals 211.

In an embodiment, combiner 210 may include a plurality of photo sensors 212 corresponding to laser diode elements 206A-D and 208A-D to generate a voltage substantially proportional to output signals 211. Each photo sensor 212 may generate a voltage signal substantially proportional to an output laser diode optical power of the corresponding laser diode elements 206A-D or 208A-D. Photo sensors 212 may include any type of photodiode known to a person of ordinary skill in the art.

In an embodiment shown in FIG. 2B, laser diode system 200 may include a plurality of gain elements, units, or stages 228, each gain element 228 corresponding to one of the plurality of pumps 202. For example, gain 228A may be electrically coupled to receive laser diode element output signals 211 from laser diode elements 206A and 208A in pump 202A while gain 228B may be electrically coupled to receive laser diode element output signals 211 from laser diode elements 206B and 208B in pump 202B, and the like. The plurality of gain elements 228 may be coupled to a combiner 210. The plurality of gain elements 228 may serve to increase the power output level of the laser diode element output signals 211 as is well known to a person of ordinary skill in the art.

In an embodiment, each of the plurality of gain elements 228 may include a plurality of photo sensors 229, that like photo sensors 212, correspond to laser diode elements 206A-D and 208A-D to generate a voltage substantially proportional to output signals 211. Each photo sensor 229 may generate a voltage signal substantially proportional to an output laser diode optical power of the corresponding laser diode elements 206A-D or 208A-D. Photo sensors 229 may include any type of photodiode known to a person of ordinary skill in the art.

A control unit 216 may control the operation of the plurality of pumps 202, gain elements 228, and combiner 211. Control unit 216 may include a processor or processing device 216A and a memory 216B. Control unit 216 that may execute instructions defining components, objects, routines, programs, instructions, data structures, virtual machines, and the like that perform particular tasks or functions or that implement particular data types. Instructions may be stored in any computer-readable storage medium known to a person of ordinary skill in the art, e.g., memory 216B. Some or all of the programs may be instantiated at run time by one or more processors comprised in a processing unit, e.g., processing device 216B. A person of ordinary skill in the art will recognize that many of the concepts associated with the exemplary embodiment of laser diode system may be implemented as computer instructions, firmware, hardware, or software in any of a variety of computing architectures, e.g., control unit 216, to achieve a same or equivalent result.

A remote control unit 226 may similarly control the operation of the plurality of pumps 202, gain elements 228, and combiner 211, alone or in combination with control unit 216. Remote control unit 226 may be coupled to control unit 216 through a global communications network 222, e.g., the Internet, using any means knowns to a person of ordinary skill in the art.

Moreover, a person of ordinary skill in the art will recognize that control unit 216 or remote control unit 226 may be implemented on any type computing architecture, e.g., general purpose or personal computers, hand-held devices, mobile communication devices, table computing devices, laptop computing devices, microprocessor-based or programmable consumer electronics, minicomputers, mainframe computers, application specific integrated circuits, and like.

A person of ordinary skill in the art will recognize that an exemplary embodiment of system 200 may be implemented in a distributed system in which various computing entities or devices, often geographically remote from one another, e.g., control unit 216 and remote control unit 226, perform particular tasks or execute particular objects, components, routines, programs, instructions, data structures, and the like. For example, the exemplary embodiment of system 200 may be implemented in a server/client configuration connected via a global network 222 (e.g., remote control unit 226 may operate as a server and control unit 216 may operate as a client, all connected through network 222). In distributed computing systems, application programs may be stored in and/or executed from memory 216B or 226B, which may include internal memory, external memory, or remote memory. Memory 216B and 226B may be any kind of memory, volatile or non-volatile, removable or non-removable, known to a person of ordinary skill in the art including non-volatile memory, volatile memory, random access memory (RAM), flash memory, read only memory (ROM), ferroelectric RAM, magnetic storage devices, optical discs, or the like. Memory 216B or 226B may be one or more individual memory devices of any type.

Control unit 216 or remote control unit 226 may additionally include a graphical user interface to receive instruction from a user as is well known to a person of ordinary skill in the art, e.g., the windowing environment provided by the Windows® operating system from Microsoft®. Other operating systems that provide graphical user interfaces may be employed, such as the Macintosh® operating system from Apple® or the OS/2 Presentation Manager from IBM®.

Processor or processing devices 216A or 226A may each be embodied in a single, central processing unit, or a plurality of processing units. Processor or processing devices 216A or 226A may each be any type of processing device, having any type of speed, capacity, functionality, or otherwise known to a person of ordinary skill in the art.

Control unit 216 or remote control unit 226 may additionally include a device interface (not shown). Device interface may operatively couple control unit 216 or remote control unit 226 with any of the plurality of pumps 202 and combiner 210. Device interface may represent either one interface or various distinct interfaces, each specially constructed to support the particular device that it interfaces. Device interface may additionally interface input or output devices utilized by a user to provide direction to the control unit 216 or remote control unit 226 and to receive information from control unit 216 or remote control unit 226. These input or output devices may include voice recognition devices, gesture recognition devices, touch recognition devices, keyboards, displays, monitors, mice, pointing devices, speakers, stylus, microphone, joystick, game pad, satellite dish, printer, scanner, camera, video equipment, modem, monitor, and the like (not shown). Device interface may be a serial interface, parallel port, game port, firewire port, universal serial bus, or any other interface known to a person of ordinary skill in the art. Device interface may be wired or wireless as is well known to a person of ordinary skill in the art.

In an embodiment, control unit 216 is geographically remote from remote control unit 226 and coupled to remote control unit 226 via network 222. Control unit 216 may be electrically coupled to the plurality of pumps 202 and combiner 210. Remote control unit 226 may control the plurality of pumps 202 and/or combiner 210 directly or through control unit 216.

A person of ordinary skill in the art will recognize that the system 200 and control units 216, 226 may use any type of computer readable medium accessible by a computer, such as magnetic cassettes, flash memory cards, compact discs (CDs), digital video disks (DVDs), cartridges, RAM, ROM, flash memory, magnetic disc drives, optical disc drives, and the like. A computer readable medium as described herein includes any manner of computer program product, computer storage, machine readable storage, or the like.

Control unit 216 or remote control unit 226 may connect to network 222 through a modem or other communications device included in or coupled to the device interface. Control unit 216 or remote control unit 226 alternatively may connect to network 222, the plurality of pumps 222, or combiner 210 using a wireless device or modem (not shown). Network 222 may be local, wide, global, or otherwise and may include wired or wireless connections employing electrical, optical, electromagnetic, acoustic, or other carriers as is known to a person of ordinary skill in the art.

The present disclosure may describe some portions of the exemplary system 200 using algorithms and symbolic representations of operations on data bits within a memory, e.g., memory 216B and 226B. A person of ordinary skill in the art will understand these algorithms and symbolic representations as most effectively conveying the substance of their work to others of ordinary skill in the art. An algorithm is a self-consistent sequence leading to a desired result. The sequence requires physical manipulations of physical quantities. Usually, but not necessarily, these quantities take the form of electrical or magnetic signals capable of being stored, transferred, combined, compared, and otherwise manipulated by physical devices, e.g., control unit 216 or remote control unit 226. For simplicity, the present disclosure refers to these physical signals as bits, values, elements, symbols, characters, terms, numbers, or like. The terms are merely convenient labels. A person of ordinary skill in the art will recognize that terms such as computing, calculating, generating, loading, determining, displaying, or like refer to the actions and processes of a computing device, e.g., control unit 216 or remote control unit 226. Control unit 216 or remote control unit 226 may manipulate and transform data represented as physical electronic quantities within a memory into other data similarly represented as physical electronic quantities within the memory.

LDDs 204A-D may receive operating parameters 230 from control unit 216 or remote control unit 226. In an embodiment, default operating parameters 230 are programmed into LDDs 204A-D at manufacture of LDD 204A. Operating parameters 230 may include any parameter known to a person of ordinary skill in the art to operate the laser diode elements 206A-D and 208A-D, e.g., wavelength, operating current level, operating voltage level, error thresholds, feedback mode, and the like. For example, LDD 204A may generate a current to power laser diode elements 206A and 208A based on a current setting operating parameter 230 or LDD 204A may set a current error threshold based on an error threshold operating parameter 230. For another example, LDD 204A may set a limit circuit to protect laser diode elements 206A and 208A based on a limit circuit operating parameter 230. LDD 204A may set a variety of safety functions based on safety operating parameters 230, e.g., brownout, slow start, delay, enable/disable, electro static discharge (ESD) protection limits, and the like.

A particular laser diode 209B on a pump 202D may fail for a variety of well-known reasons after system 200 is deployed to a site. For example, laser diode 209B may fail to generate an output signal 211 at all or may generate an output signal 211 that does not provide the expected power level as measured by LDD 204B or by downstream gain elements 228, combiner 210, or photo diode sensors 212, 229. A particular pump, e.g., pump 202D, may also fail for a variety of well-known reasons after system 200 is deployed to a customer's site. For example, pump 202D may fail to generate any output signal 211 from any of the laser diode elements 206D or 208D because of a failure of a power source included in LDD 204D.

Gain element 228B, combiner 210, or photo sensors 212 may detect failure of particular laser diode element 209B or failure of pump 202D and report the failure to control unit 216 and/or remote control unit 226 via network 222. Photo sensors 212 or 229 either included in gain elements 228 or in combiner 210 may generate a voltage substantially proportional to a power output of the laser diode elements 206A-D or 208A-D allowing for detection of failed laser diode element 209B or failed pump 202D if the measured current falls below the expected current by a particular threshold as explained in more detail below.

Control unit 216 or remote control unit 226 may display the detected failure to a customer or user using a graphical user interface. Control unit 216 or remote control unit 226 may identify failed laser diode element 209B or failed pump 202D on using the graphical user interface. In an embodiment, control unit 216 or remote control unit 226 may alert a customer or user of the failure once detected by any means known to a person of ordinary skill in the art, e.g., visual display of a message on the graphical user interface identifying failed laser diode element 209B or failed pump 202D, an audible alert or alarm using control unit 216 or remote control unit 226, generating and transmitting an email or text message including identification of failed laser diode element 209B or failed pump 202D from control unit 216 or remote control unit 226 to any external device (e.g., mobile device), generating and transmitting an alert message on any known applications, and the like.

In response to detecting failed laser diode element 209B or failed pump 202D, combiner 210, photo sensors 212, or gain elements 228 may request that control unit 216 or remote control unit 226 disable failed laser diode element 209B or failed pump 202D. The request may specifically identify failed laser diode element 209B or failed pump 202D.

In an embodiment, a user may be authenticated—through the use of a secure key 232 entered using control unit 216 or remote control unit 226—to enter operating parameters 230 or to disable failed laser diode element 209B or failed pump 202D in laser system 200. Based on detecting failed laser diode element 209B or failed pump 202D and alerting a user of failed laser diode element 209B or failed pump 202D, control unit 216 or remote control unit 226 may decode secure key 232 to thereby authenticate a user and permit access to control unit 216 or remote control unit 226. Secure key 232 may be encoded using any of kind of cryptographic algorithms or schemes known to a person of ordinary skill in the art, e.g., identity based cryptography or encryption, public/private key pairs, attribute based encryption, and the like. In an embodiment, secure key 232 may be an access password using well known security protocols. Control unit 216 or remote control unit 226 may allow or deny access to control of laser system 200 based on secure key 232. In an embodiment, control unit 216 or remote control unit 226 may allow or deny a user to disable failed laser diode element 209B or failed pump 202D based on decoding and authenticating secure key 232. In another embodiment, control unit 216 or remote control unit 226 may automatically disable failed laser diode element 209B or failed pump 202D without user intervention and/or without necessitating a security key 232, based on identifying the failed laser diode element 209B or failed pump 202D.

Control unit 216 or remote control unit 226 may trigger or otherwise initiate a recalibration of laser system 200 based on detecting failed laser diode element 209B or failed pump 202D and/or disablement of failed laser diode element 209B or failed pump 202D. In an embodiment, control unit 216 or remote control unit 226 may trigger or otherwise initiate recalibration of laser system 200 automatically, without user intervention. Alternatively, control unit 216 or remote control unit 226 may trigger or otherwise initiate recalibration of laser system 200 based on authenticating secure key 232. Control unit 216 or remote control unit 226 may trigger or otherwise initiate a dynamic recalibration of laser system 200 to account for diminished power output resulting from failed laser diode element 209B or failed pump 202D. Doing so, allows laser system 200 to continue operating albeit at a reduced power laser source signal 214, which, in turn, allows laser system 200 to complete tasks that do not require full power output.

Figure 3:
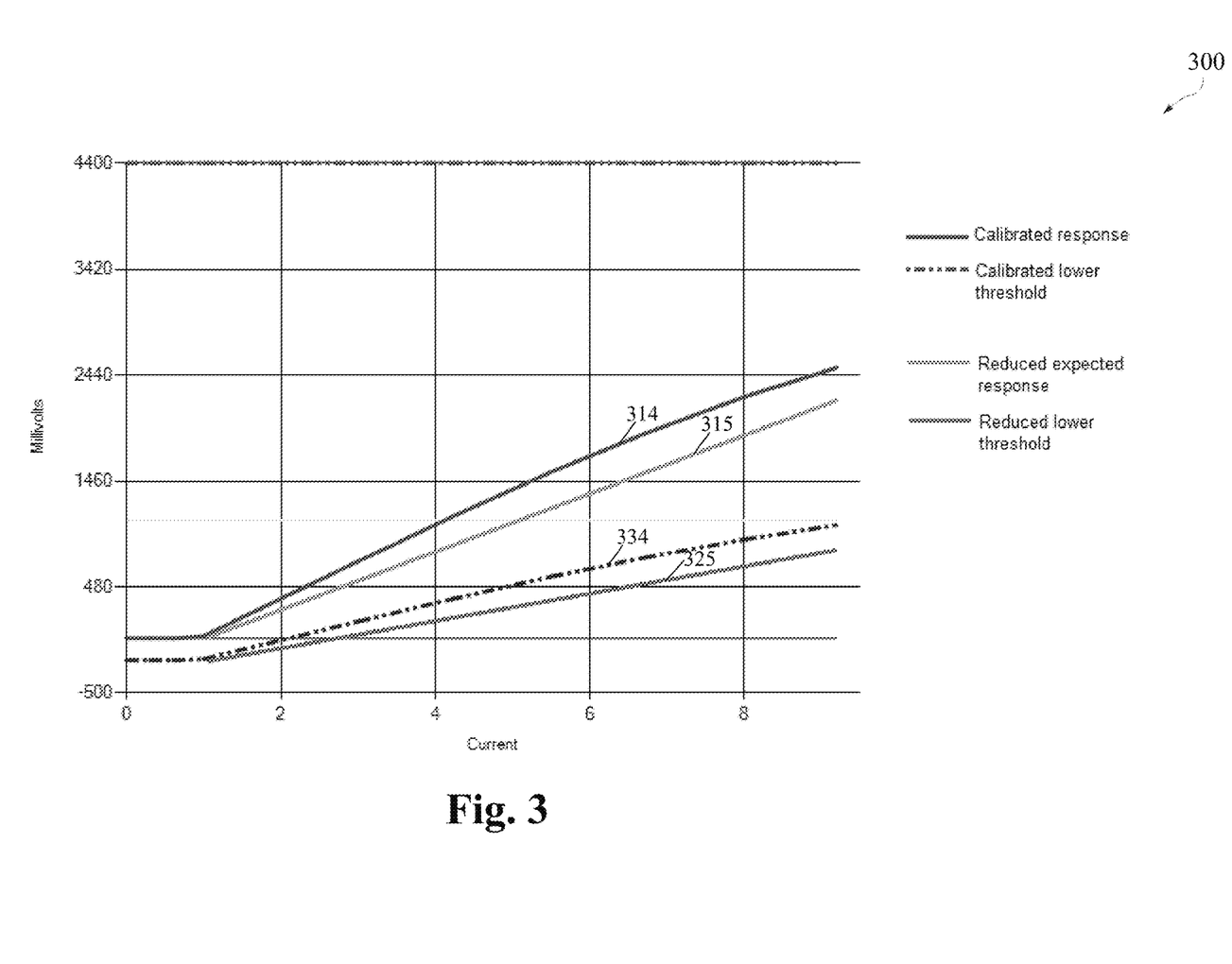
FIG. 3 diagrams an embodiment of recalibration signals after failure detection.

Failed laser diode element 209B or failed pump 202D may be disabled via software or firmware. Laser system 200, via control unit 216, remote control unit 226, combiner 210, or gain elements 228, may keep a count of the disabled failed laser diode element 209B or failed pump 202D FIG. 3 diagrams an embodiment of recalibration signals after failure detection. Referring to FIGS. 2A, 2B, and 3, control unit 216 or remote control unit 226 may initially calibrate laser system 200 to have a laser source signal 314 with a corresponding calibration threshold 334. Thus, if laser source signal 314 dips below calibration threshold 334, control unit 216 or remote control unit 226 may detect a failure in laser system 200, e.g., failed laser diode element 209B or failed pump 202D. Upon detection or disabling of failed laser diode element 209B or failed pump 202D, control unit 216 may recalibrate laser system 200 to account for failed laser diode element 209B or failed pump 202D to have a recalibrated reduced expected response signal 315 with a corresponding reduced lower recalibration threshold 325 to avoid false error indications. This is because the possibility of having false error indications increase if the calibrated lower threshold signal 334 is maintained while reducing the expected response to 315. Predetermined thresholds in laser system 200 may be reduced in proportion to the number of disabled modules, e.g., laser diodes or pumps, compared to the number of modules originally in system 200. For example, if failed pump 202D is one of four pumps, the reduced expected response 334 and reduced lower threshold may be reduced by a quarter compared to the expected calibrated response 314 and calibrated lower threshold 315.

Figure 4A:
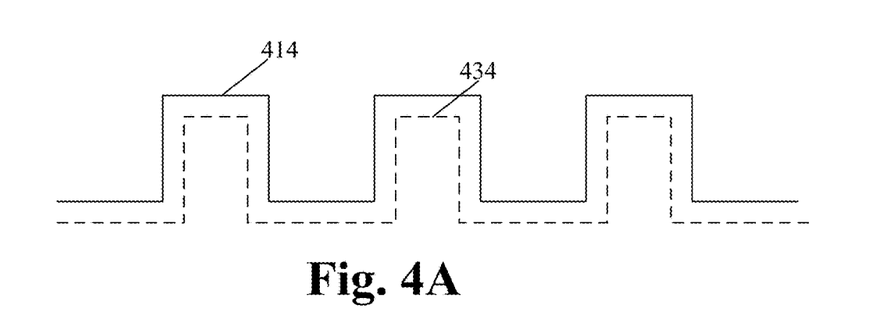
FIGS. 4A and 4B diagram an embodiment of error detection in a laser system according to the present disclosure.
Figure 4B:
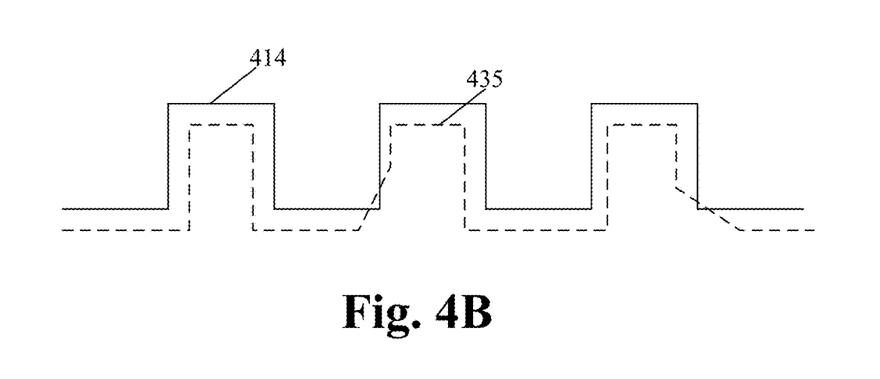

FIGS. 4A and 4B diagram an embodiment of error detection in a laser system according to the present disclosure. Referring to FIGS. 4A and 4B, control unit 216 or remote control unit 226 may be programmed to track laser source signal 214 to detect unexpected drops in power level due to, e.g., detecting or disabling failed laser diode element 209B or failed pump 202D. Control unit 216 or remote control unit 226 may track a laser source signal 214 output from combiner 210 as signal 414 while tracking the expected calibrated threshold as signal 434. In some embodiments, control unit 216 or remote control unit 226 may sample laser source signal 214 at time intervals, periodic or otherwise, to determine whether the sampled point falls below the expected threshold signal 434. In some cases, laser source signal 434 or expected threshold signal 435 may deviate from ideal due to a variety of spurious, often temporary, events including power supply spikes on any of LDDs 204A-D. To avoid indicating an actual failure mode, control unit 216 or remote control unit 226 may analyze several samples of laser source signal 434 and compare it to threshold signal 435 to determine if an actual failure has occurred rather than a temporary or spurious failure. In an embodiment, control unit 216 or remote control unit 226 may set a threshold number of out of bounds measurement samples, e.g., 3, 10, or 50, of laser signal 434 compared to threshold signal 435 before detecting and indicating a failure.

In some embodiments, combiner 210 may track and measure laser source signal 434 and compare it to threshold signal 435. Firmware in control unit 216 or remote control unit 236 may constantly (once every 200 microseconds) analyze photo diode sensor 212 readings for out-of-bounds values. Normally, these out-of-bounds readings may result in an error condition that may shut down laser system 200. By establishing a threshold number of out of bounds measurements before triggering a failure, unnecessarily shutting down laser system 200 is avoided, allowing time to evaluate the need for an emergency service visit.

In an embodiment, a setting in the firmware perhaps included in operating parameters 230 specifies a number of out-of-bounds readings that will be skipped before an error or fault condition will be reported. If the spurious readings do not persist beyond the skip threshold, no error condition will result.

Figure 5:
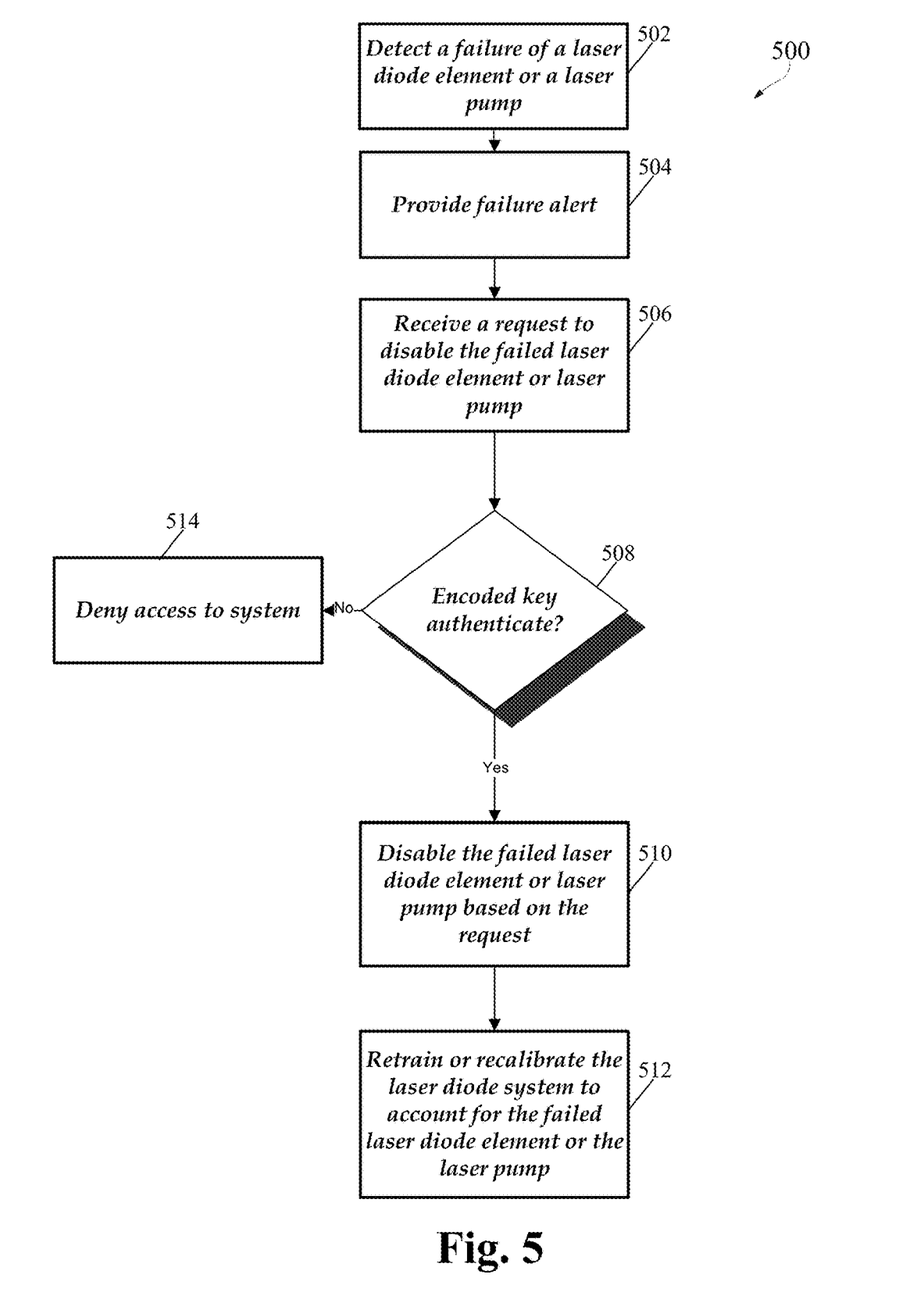
FIG. 5 diagrams an embodiment of a method of operating a fiber laser system according to the present disclosure.

FIG. 5 diagrams an embodiment of a method of operating a fiber laser system according to the present disclosure. Referring to FIGS. 2A, 2B, and 5, at 502, method 500 may detect either full or partial failure of failed laser diode element 209B or failed pump 202D. Method 500 may detect failed laser diode element 209B or failed pump 302D using any means known to a person of ordinary skill in the art, including using photo sensors 212 or 229 to generate a voltage substantially proportional to the output of laser diode elements 206A-D and 208A-D and measuring the generated current from photo sensors 212 against an expected current based on operating parameters 230.

At 504, method 500 may indicate failed laser diode element 209B or failed pump 302D by any means known to a person of ordinary skill in the art, including visually displaying an indication of failure on a graphical user interface of control unit 216 or remote control unit 226, triggering an audible alert or alarm on control unit 216 or remote control unit 226, composing and transmitting an email or text message, generating and transmitting an email or text message including identification of failed laser diode element 209B or failed pump 202D from control unit 216 or remote control unit 226 to any external device (e.g., mobile device), generating and transmitting an alert message on any known applications, and the like.

At 506, method 500 may optionally receive a request to disable failed laser diode element 209B or failed pump 302D including an identification of failed laser diode element 209B or failed pump 302D. In an embodiment in which combiner 210 or gain elements 228 measure the measured current generated by photo diode sensors 210 against an expected current based on operating parameters 230, combiner 210 may transmit the request to control unit 216 or to remote control unit 226.

At 508, method 500 control unit 216 or remote control unit 226 receive an encoded key 232 and authenticate the encoded key 232 by, e.g., decoding the encoded key 232. If the encoded key 232 is not authenticated, method 500 may deny access to the system at 514 using control unit 216 or remote control unit 226.

At 510, if method 500 authenticates encoded key 232, method 500 will disable failed laser diode element 209B or failed pump 302D by any means known to a person of ordinary skill in the art. In an embodiment, method 500 may automatically disable failed laser diode element 209B or failed pump 202D without user intervention and/or without necessitating authentication of any security key, upon detection of either full or partial failure of failed laser diode element 209B or failed pump 202D.

At 512, method 500 may recalibrate the laser diode system to account for failed laser diode element 209B or failed pump 302D to account for diminished power output resulting from failed laser diode element 209B or failed pump 202D. Doing so, allows laser system 200 to continue operating albeit at a reduced power laser source signal 214, which, in turn, allows laser system 200 to complete tasks that do not require full power output.

A person of ordinary skill in the art will appreciate that that the present disclosure is not limited to what has been particularly shown and described hereinabove. Rather, the scope of the present disclosure includes both combinations and sub-combinations of the various features described hereinabove as well as modifications and variations which would occur to such skilled persons upon reading the foregoing description. Thus only the appended claims may limit the present disclosure.

The invention claimed is:

1. A method, comprising:
    detecting, at a computing device, a failed laser diode element or a failed laser pump in a laser diode system including a plurality of laser diode elements arranged in a plurality of laser pumps;
    receiving, using the computing device, an encoded key after the detecting;
    disabling, using the computing device, the failed laser diode element or the failed laser pump in the laser diode system based at least in part on the encoded key; and
    recalibrating, using the computing device, the laser diode system after disabling the failed laser diode element or the failed laser pump,
    wherein the failed laser diode element or failed laser pump comprises a first laser diode element or a first laser pump and the other laser diode element(s) or laser pump(s) comprise second laser diode element(s) or second laser pump(s), and wherein the recalibrated laser diode system is configured to generate a power output signal using only the second laser diode element(s) and the second laser pump(s).

2. The method of claim 1, further comprising:
    authenticating, using the computing device, the encoded key; and
    disabling, using the computing device, the first laser diode element or the first laser pump in the laser diode system based at least in part on the authenticating.

3. The method of claim 1, further comprising:
    receiving, using the computing device, a request to disable the first laser diode element or the first laser pump in the laser diode system; and
    disabling the first laser diode element or the first laser pump in the laser diode system based at least in part on the request.

4. The method of claim 3, further comprising:
    receiving, at the computing device, an identification of the first laser diode element or the first laser pump in the request.

5. The method of claim 1, wherein the power output signal comprises a reduced power output signal.

6. The method of claim 1, further comprising:
    denying access to the laser diode system based at least in part on failing to authenticate the encoded key.

7. A laser diode system, comprising:
a plurality of laser pumps, each of the plurality of laser pumps including a plurality of laser diode drivers and a corresponding plurality of laser diode elements, wherein each of the plurality of laser diode drivers is electrically coupled to power at least two of the plurality of laser diode elements;
a combiner electrically coupled to the plurality of laser diode elements to combine an output of each of the plurality of laser pumps to generate a combined output light; and
a controller to:
identify a failed laser pump or a failed laser diode element;
receive an encoded key to gain access to the controller;
disable the failed laser pump or the failed laser diode element based at least in part on authenticating the encoded key; and
recalibrate the laser diode system to account for the failed laser pump or the failed laser diode element, wherein the recalibrated laser diode system is configured to generate a power output signal using only a subset of the laser pumps or only a subset of the laser diode elements.

8. The laser diode system of claim 7, wherein the power output signal comprises a reduced power output signal.

9. The laser diode system of claim 7, wherein recalibrate the laser diode system includes recalibrate the combiner based at least in part on the failed laser pump or the failed laser diode element.

10. The laser diode system of claim 7, wherein recalibrate the laser diode system includes reducing power output in proportion to a number of the failed laser diode drivers or a number of the failed laser diode elements.

11. The laser diode system of claim 7,
wherein each of the plurality of laser diode drivers includes a corresponding power supply; and
wherein the controller is further to identify a failed power supply.

12. The laser diode system of claim 7, wherein the controller is further to deny access to the laser diode system based at least in part on an inability to authenticate the encoded key.

13. The laser diode system of claim 7, wherein the controller is further to track the failed laser diode driver or the failed laser diode element.

14. A laser diode system, comprising:
a plurality of laser pumps, each of the plurality of laser pumps including a plurality of laser diode drivers and a corresponding plurality of laser diode elements, wherein each of the plurality of laser diode drivers is electrically coupled to power at least two of the plurality of laser diode elements; and
a controller to:
identify a failed laser pump or a failed laser diode element; and
automatically disable the failed laser pump or the failed laser diode element based at least in part on identifying the failed laser pump or the failed laser diode element; and
recalibrate the laser diode system to account for the failed laser pump or the failed laser diode element, wherein the recalibrated laser diode system is configured to generate a power output signal using only a subset of the laser pumps or a subset of the laser diode elements.

15. The laser diode system of claim 14, further comprising:
a combiner electrically coupled to the plurality of laser diode elements to combine an output of each of the plurality of laser pumps to generate a combined output light.

16. The laser diode system of claim 14, further comprising:
a plurality of gain elements electrically coupled to the plurality of pumps to increase a power level of a plurality of laser element output signals output from the plurality of laser diode drivers.

17. The laser diode system of claim 14, wherein the controller is further to automatically disable the failed laser pump or the failed laser diode element based at least in part on decoding an encoded security key.

18. The laser diode system of claim 17, wherein the controller is further to deny access to the laser diode system based at least in part on the encoded security key.

19. The laser diode system of claim 14, wherein the power output signal comprises a reduced power output signal.

20. The laser diode system of claim 19, wherein recalibrate the laser diode system to account for the failed laser pump or the failed laser diode element further comprises recalibrating one or more photo-sensors of the laser diode system based on reduced light associated with the reduced power output signal.

* * * * *